(12) United States Patent
Unrath

(10) Patent No.: US 9,845,858 B2
(45) Date of Patent: Dec. 19, 2017

(54) CAMSHAFT

(71) Applicant: Mahle International GmbH, Stuttgart (DE)

(72) Inventor: Christoph Unrath, Urbach (DE)

(73) Assignee: Mahle International GmbH (DE)

( * ) Notice: Subject to any disclaimer, the term of this patent is extended or adjusted under 35 U.S.C. 154(b) by 203 days.

(21) Appl. No.: 14/442,342

(22) PCT Filed: Oct. 29, 2013

(86) PCT No.: PCT/EP2013/072546
§ 371 (c)(1),
(2) Date: May 12, 2015

(87) PCT Pub. No.: WO2014/075908
PCT Pub. Date: May 22, 2014

(65) Prior Publication Data
US 2016/0273639 A1 Sep. 22, 2016

(30) Foreign Application Priority Data
Nov. 13, 2012 (DE) .................. 10 2012 220 652

(51) Int. Cl.
*F16H 53/00* (2006.01)
*F01L 1/047* (2006.01)
*F16H 53/02* (2006.01)
*F01L 1/344* (2006.01)

(52) U.S. Cl.
CPC ............ *F16H 53/025* (2013.01); *F01L 1/047* (2013.01); *F01L 1/3442* (2013.01)

(58) Field of Classification Search
CPC ........ F16H 53/00; F16H 53/02; F16H 53/025; F01L 1/047; F01L 1/3442; F01L 2001/0471; F01L 2001/0473; B21D 53/845
See application file for complete search history.

(56) References Cited

U.S. PATENT DOCUMENTS

| 4,867,004 A * | 9/1989 | Swars ................. B21D 39/203 29/523 |
| 4,949,683 A | 8/1990 | Swars |
| 4,993,282 A * | 2/1991 | Swars ................. B21D 53/845 123/90.6 |

(Continued)

FOREIGN PATENT DOCUMENTS

| DE | 3803685 A1 | 8/1989 |
| DE | 3943426 C1 | 4/1991 |

(Continued)

OTHER PUBLICATIONS

English abstract for DE-3943426.
German Search Report for DE-102012220652.3, dated Sep. 25, 2013.

*Primary Examiner* — Adam D Rogers
(74) *Attorney, Agent, or Firm* — Fishman Stewart PLLC

(57) ABSTRACT

A camshaft may include a tubular outer shaft and an inner shaft arranged coaxially thereto. The inner shaft may be rotatable at least partially with respect to the outer shaft. An annular gap may be disposed between the inner shaft and the outer shaft. The outer shaft may include at least one radially inwardly projecting annular step facing the inner shaft. The at least one annular step may mount the inner shaft with respect to the outer shaft.

16 Claims, 2 Drawing Sheets

(56) References Cited

U.S. PATENT DOCUMENTS

| | | | | |
|---|---|---|---|---|
| 5,052,845 A | * | 10/1991 | Maus | B21D 39/203 29/523 |
| 5,201,247 A | * | 4/1993 | Maus | B21D 39/203 123/90.34 |
| 7,610,890 B2 | | 11/2009 | Lettmann et al. | |
| 7,802,549 B2 | * | 9/2010 | Schneider | F01L 1/047 123/90.44 |
| 9,032,923 B2 | * | 5/2015 | Yoshika | F01L 1/047 123/90.17 |
| 2005/0235939 A1 | | 10/2005 | Wilke | |
| 2006/0060159 A1 | * | 3/2006 | Moretz | F01L 1/053 123/90.17 |
| 2011/0114046 A1 | * | 5/2011 | Flender | F01L 1/34 123/90.6 |
| 2012/0235518 A1 | | 9/2012 | Hentsch et al. | |
| 2017/0130615 A1 | * | 5/2017 | Schacherer | F16H 53/025 |

FOREIGN PATENT DOCUMENTS

| | | | | |
|---|---|---|---|---|
| DE | 9320451.5 | | 9/1994 | |
| DE | 102005014680 A1 | | 8/2006 | |
| DE | 102005062207 A1 | | 6/2007 | |
| EP | 2500532 A1 | | 9/2012 | |
| JP | 07 224617 | | 8/1995 | |
| WO | WO-2006/081789 A1 | | 8/2006 | |
| WO | WO-2009/005999 A1 | | 1/2009 | |
| WO | WO-2013/023921 A1 | | 2/2013 | |
| WO | WO 2016071019 A1 | * | 5/2016 | F01L 1/047 |
| WO | WO 2017016866 A1 | * | 2/2017 | F01L 1/047 |

* cited by examiner

CAMSHAFT

CROSS-REFERENCE TO RELATED APPLICATIONS

This application claims priority to German Patent Application No. 10 2012 220 652.3, filed Nov. 13, 2012, and International Patent Application No. PCT/EP2013/072546, filed Oct. 29, 2013, both of which are hereby incorporated by reference in their entirety.

TECHNICAL FIELD

The present invention relates to a camshaft having a tubular outer shaft and an inner shaft, which is arranged coaxially thereto and can be rotated at least to a limited extent with respect to the outer shaft, according to the preamble of the independent claims.

BACKGROUND

EP 1 963 625 B1 discloses a generic camshaft having an outer shaft and an inner shaft arranged coaxially thereto, the inner shaft being supported directly against a stepless inner lateral face of the outer shaft by means of at least one securing device arranged on an axial end region of the shaft.

Owing to the necessary freedom of movement between the inner shaft and the outer shaft in an adjustable camshaft and/or owing to a necessary oil duct for a phase adjuster and/or bearing lubrication, a sufficient annular gap of between 0.2 and 2 mm in radial height is usually required between the inner shaft and the outer shaft. Sealing is therefore needed at the end of the two shafts to be able to build up the oil pressure necessary for the phase adjuster between the inner shaft and the outer shaft. With inner shafts known from the prior art, they are usually thickened in the region of a sealing ring, which can be achieved for example by removing material from almost the entire length of the inner shaft adjacent to the annular seal. This is however very expensive and requires an initially unmachined inner shaft with a comparatively large amount of material.

SUMMARY

The present invention is therefore concerned with the problem of specifying an improved embodiment for a camshaft of the generic type, which in particular has a different mounting of an inner shaft in relation to an outer shaft.

This problem is solved according to the invention by the subject matter of the independent claims. Advantageous embodiments form the subject matter of the dependent claims.

The present invention is based on the general concept of, in a camshaft known per se having a tubular outer shaft and an inner shaft, which is arranged coaxially thereto and can be rotated at least to a limited extent with respect to the outer shaft, providing at least one annular step, which projects radially inwards and by means of which the inner shaft can be mounted on the outer shaft. In contrast, the inner shaft has a constant outer diameter and does not need further post-machining, for example after drawing of same. The minimum diameter of the inner shaft is thus limited only by the required torsion resistance and the pinning of cams coupled to the inner shaft (pin diameter). It is also of particular advantage in the camshaft according to the invention that the inner shaft does not have to be post-machined, in particular turned, over most of its outer circumferential face as previously customary, as a result of which the inner shaft can be produced comparatively simply and cost-effectively. The outer shaft is partially thickened only in the region of the bearing point and in the region of the sealing point by the radially inwardly projecting annular step, the effort for producing said radial annular step during production of the outer shaft being very low. The annular step can for example be produced by means of a forming process, in particular by upsetting or forming under combined tensile and compressive conditions during drawing of the outer shaft. Depending on the radial thickness of the annular step according to the invention, said step can even hold or mount a sealing ring.

In a further advantageous embodiment of the solution according to the invention, the inner shaft has an outwardly open groove, in particular a circumferential groove, in which a sealing ring is arranged, which is arranged at the axial height of the annular step when the camshaft is assembled. Additionally or alternatively to the sealing ring arranged in the region of the annular step of the outer shaft, a sealing ring can thus be arranged in an outwardly open groove in the inner shaft, in particular if the inner shaft is formed as a solid profile. If the inner shaft is formed as a tube, the sealing ring is preferably arranged in the inwardly open groove in the outer shaft. The radially inwardly projecting annular step can be arranged on the longitudinal end of the outer shaft, but purely theoretically can also be arranged at a plurality of positions spaced apart axially on the outer shaft.

In an advantageous development of the solution according to the invention, the at least one annular step has chamfered edges. Such chamfered edges make it easier to insert the inner shaft and thus to assemble the camshaft. Additionally or alternatively, the inner shaft has on at least one end an oblique introduction face, which likewise makes it easier to insert the inner shaft into the outer shaft when assembling the camshaft.

The annular gap expediently has a radial thickness of 0.2 to 2.0 mm. In order to be able to keep a sufficient oil volume in the annular gap, for example for lubricating sliding bearings or for actuating a phase adjuster, the described annular gap is provided between the inner shaft and the outer shaft. The annular gap is used in particular as an oil guide.

In general, the camshaft according to the invention can be assembled comparatively simply. To this end, for example, a sealing ring is first placed into an outwardly open groove in the inner shaft, then an assembly sleeve is pushed over the sealing ring. The assembly sleeve causes the sealing ring to be pressed into the groove on the inner shaft side. Then the inner shaft is inserted into the outer shaft and the camshaft is assembled thereby. The assembly sleeve is then withdrawn, as a result of which the sealing ring that is pressed into the groove in the inner shaft bears against an inner lateral face of the outer shaft and thereby seals off the annular gap between the inner shaft and the outer shaft. If, however, the sealing ring is arranged in a groove in the outer shaft in an alternative embodiment, the sealing ring is first placed into the inwardly open groove in the outer shaft and then the inner shaft is inserted into the outer shaft. The oblique introduction face at the front end of the inner shaft, as seen in the insertion direction, can prevent damage to the sealing ring during insertion. Comparatively simple assembly of the camshaft is thus possible in the last-mentioned embodiment.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
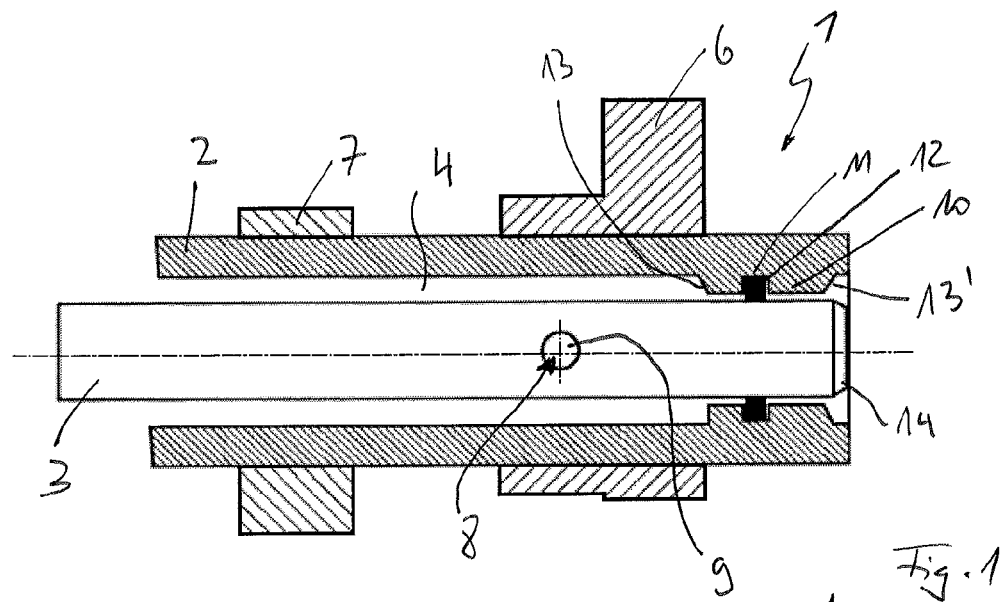
FIG. 1 schematically shows a sectional diagram through a first possible embodiment of a camshaft according to the invention, FIG. 2 schematically shows a diagram as in FIG. 1, but with a sealing ring mounted on an inner shaft, FIG. 3 schematically shows a diagram as in FIG. 2, but with a differently formed radial annular step, FIG. 4 schematically shows a sectional diagram through a camshaft according to the invention with a phase adjuster arranged at the end, FIG. 5A-D schematically show individual method steps for assembling the camshaft according to the invention.
Figure 2:
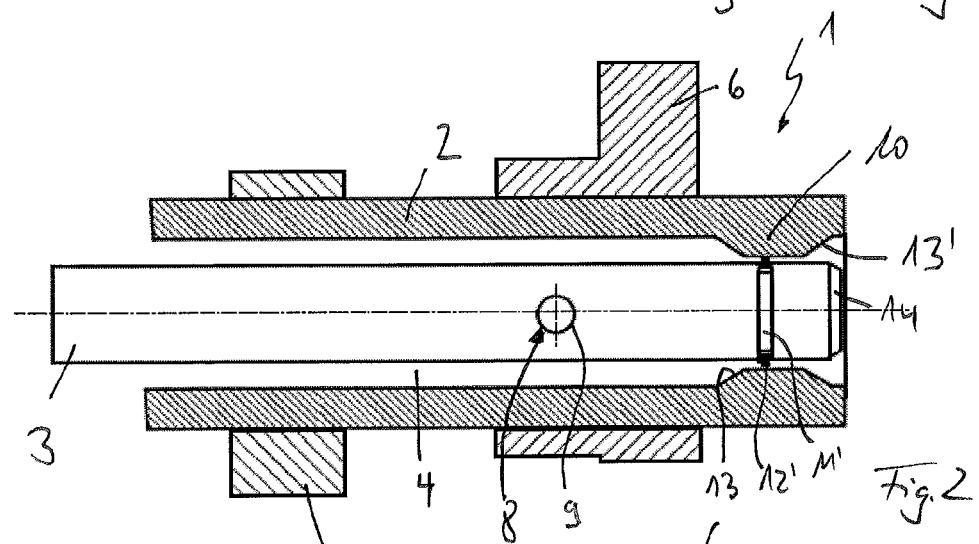
Figure 3:
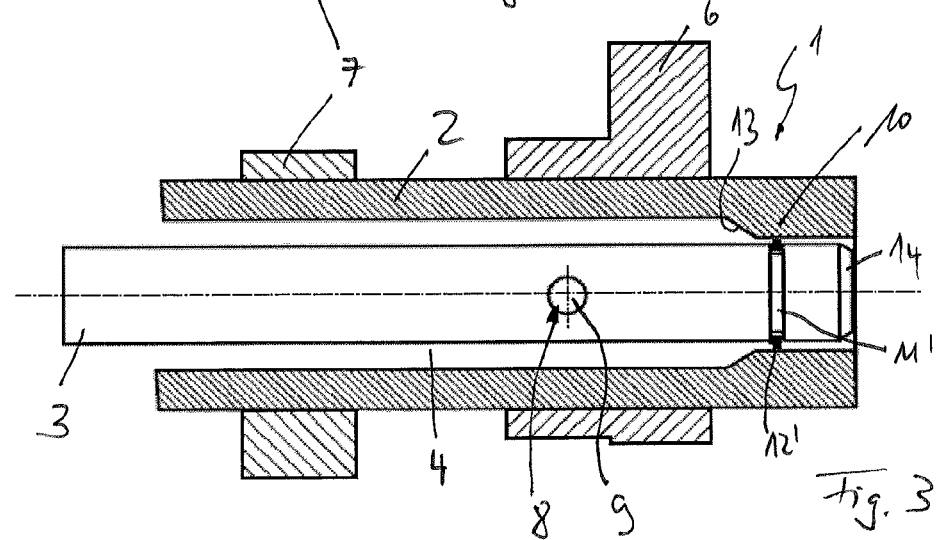

According to FIGS. 1 to 4, a camshaft 1 according to the invention has a tubular outer shaft 2 and an inner shaft 3, which is arranged coaxially thereto and can be rotated at least to a limited extent with respect to the outer shaft 2. An annular gap 4 is provided at least in some regions between the inner shaft 3 and the outer shaft 2, to conduct oil for the lubrication of sliding bearings and/or for actuating a phase adjuster 5 (compare FIG. 4). Such a phase adjuster 5 is used in a known manner for the relative rotation of the inner shaft 3 with respect to the outer shaft 2, the inner shaft 3 being connected in a rotationally fixed manner to first cams 6, and the outer shaft 2 being connected in a rotationally fixed manner to second cams 7. The rotationally fixed connection between the inner shaft 3 and the first cams 6 takes place by means of a pin arrangement 8, which in each case has a pin 9, which is inserted into the inner shaft 3 and at the same time is connected in a rotationally fixed manner to the first cam 6. A slot, which extends in the circumferential direction, is provided in the outer shaft 2 at the axial height of the pin 9, in which slot the pin 9 can be moved during a relative rotation of the inner shaft 3 with respect to the outer shaft 2.

In order to be able to seal off the annular gap 4 in the axial direction of the camshaft 1, the outer shaft 2 has according to the invention at least one radially inwardly projecting annular step 10, by means of which the inner shaft 3 is mounted and sealed off with respect to the outer shaft 2. The annular step 10 arranged on an inner lateral face of the outer shaft 2 can be produced comparatively simply and cost-effectively, for example by a forming process, in particular by upsetting or by forming under combined tensile and compressive conditions during drawing of the outer shaft 2. The annular step 10 offers the great advantage that the inner shaft 3 can be configured with a constant outer diameter and as a result can be produced in a comparatively cost-effective manner. A previously complex and expensive post-machining of the inner shaft 3 can also usually be omitted.

Figure 4:
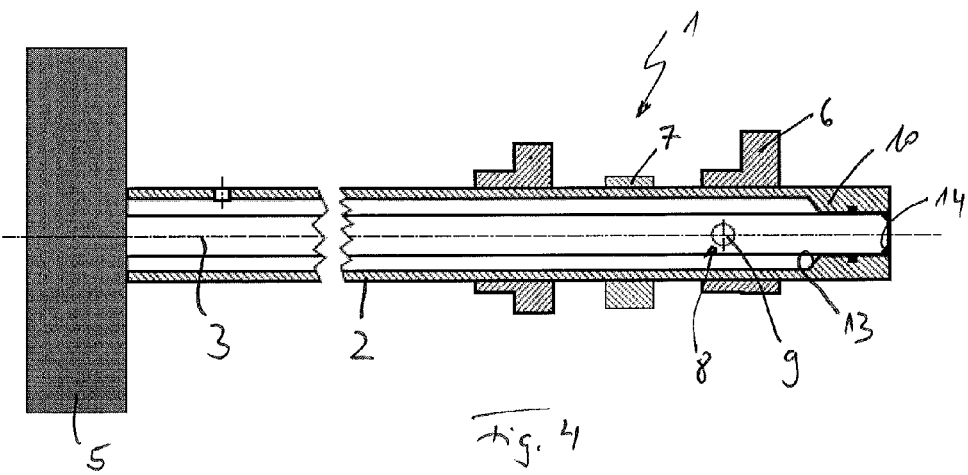
Figure 5:
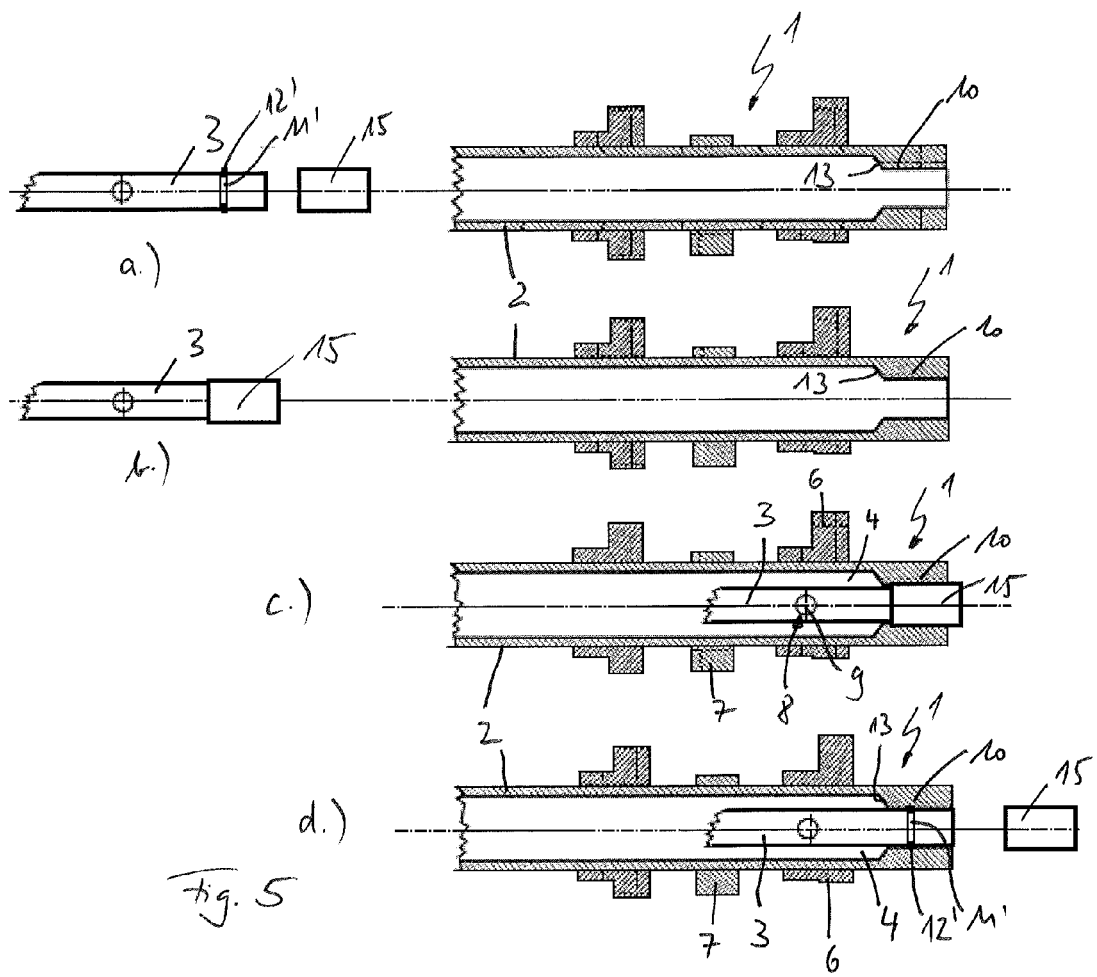

If FIGS. 1 and 4 are viewed, it can be seen that the outer shaft 2 has an inwardly open annular groove 11 in the region of the annular step 10, in which groove a sealing ring 12 is arranged. In contrast to this, the inner shaft 3 according to FIGS. 2, 3 and 5 has an outwardly open annular groove 11, in which a sealing ring 12' is arranged, the sealing ring 12' being arranged at the axial height of the annular step 10 when the camshaft 1 is assembled. When the groove 11 is provided in the region of the annular step 10, no reduction in the cross section of the inner shaft 3 is necessary, so the shaft can be restricted to the minimum required diameter, which is only limited by the necessary torsion resistance and the pin arrangement 8 of the first cams 6 (diameter of the pins 9). The sealing ring 12 mounted in the outer shaft 2 also provides advantages in particular during assembly of the camshaft 1, as is explained below. Since the inner shaft 3 in this case has a much smaller diameter overall, which is limited only by the torsion resistance and the pin arrangement 8, said shaft can also be made much lighter than inner shafts known previously from the prior art. The inner shaft 3 shown is formed as a solid profile, a hollow inner shaft 3 of course also being conceivable.

The sealing ring 12, 12' can be formed from a plastic, in particular from an elastomer or a polytetrafluoroethylene (PTFE), metallic sealing rings of course also being conceivable. The sealing ring 12, 12' can withstand the chemical environment inside the camshaft 1, as well as the temperatures occurring during operation of an internal combustion engine containing the camshaft 1, for a long time. The plastics mentioned for the sealing ring 12, 12' should be understood as mere examples; other plastics are also conceivable.

If FIGS. 1 to 5 are viewed, it can be seen that the at least one annular step 10 has at least one chamfered edge 13, even two chamfered edges 13, 13' depending on the embodiment, which make it easier to insert the inner shaft 3 into the outer shaft 2. Similarly, an oblique introduction face 14 can be provided on at least one end of the inner shaft 3, which face makes it easier to introduce the inner shaft 3 into the outer shaft 2 and thus to assemble the camshaft. If the annular step 10 is situated on the axial end region of the outer shaft 2, as is shown for example in FIGS. 3 to 5, the annular step 10 usually only has one chamfered edge 13.

FIGS. 5a to 5d show a possible assembly of the camshaft 1 according to the invention; in the first method step according to FIG. 5a, an assembly sleeve 15 is first aligned coaxially to the inner shaft 3. In this case the inner shaft 3 bears the sealing ring 12' in its groove 11'. In the method step shown in FIG. 5b, the assembly sleeve 15 is then pushed over the sealing ring 12' and thus over the inner shaft 3, then, in the method step according to FIG. 5c, the inner shaft 3 is inserted into the outer shaft 2 of the camshaft 1. When the assembly aid 15 is placed over the inner shaft 3, the assembly aid 15 presses the sealing ring 12' into the groove 11' on the inner shaft side. Once the final position of the inner shaft 3 in the outer shaft 2 is reached, the assembly sleeve 15 is withdrawn according to the method step in FIG. 5d, whereupon the sealing ring 12' rises at least partially out of the groove 11' in the inner shaft 3 and bears against an inner lateral face of the outer shaft 2, that is, against the inner lateral face of the annular step 10.

If, however, the sealing ring 12 is arranged in the groove 11 in the outer shaft 2, to assemble the camshaft 1, the sealing ring 12 is first positioned in the groove 11, whereupon the inner shaft 3 is then inserted into the outer shaft 2, and, because of the continuous outer diameter of the inner shaft 3, no damage to the sealing ring 12 occurs even when the inner shaft is inserted into the outer shaft 2, so in this case an assembly aid 15 can be omitted entirely.

With the camshaft 1 according to the invention, not only the assembly thereof can be simplified, but also the weight thereof can be much reduced, which is of great advantage in particular in internal combustion engines used in motor vehicles. In addition, the radial annular step 10 is comparatively simple and cost-effective to produce, which constitutes a clear advantage compared with an inner shaft that was previously post-machined in a complex manner over almost its entire axial length.

The invention claimed is:

1. A camshaft comprising:
   a tubular outer shaft and an inner shaft arranged coaxially thereto and rotatable at least partially with respect to the outer shaft;
   an annular gap disposed between the inner shaft and the outer shaft;
   at least one annular step disposed on the outer shaft and projecting radially inwards towards the inner shaft;
   wherein the inner shaft is mounted with respect to the outer shaft via the at least one annular step; and
   wherein the annular gap has a radial thickness of 0.2-2 mm.

2. The camshaft according to claim 1, wherein the inner shaft has an outwardly open groove facing the outer shaft, and a sealing ring is arranged in the groove to seal the annular gap between the inner shaft and the outer shaft, wherein the sealing ring is arranged at an axial extent corresponding to the at least one annular step disposed opposite thereof on the outer shaft.

3. The camshaft according to claim 2, wherein the sealing ring is composed of at least one of an elastomer and a polytetrafluoroethylene (PTFE) material.

4. The camshaft according to claim 1, wherein the at least one annular step is formed on the outer shaft via an upsetting process.

5. The camshaft according to claim 1, wherein the at least one annular step has at least one chamfered edge.

6. The camshaft according to claim 1, wherein the inner shaft has an axially oblique introduction face on at least one longitudinal end of the inner shaft.

7. The camshaft according to claim 1, wherein the inner shaft is fixedly connected to at least one first cam and the outer shaft is fixedly connected to at least one second cam.

8. The camshaft according to claim 1, wherein the at least one annular step is a radially thickened region of the outer shaft disposed at an axial end thereof.

9. The camshaft according to claim 8, wherein the annular gap extends continuously in an axial direction between another axial end of the outer shaft opposite the at least one annular step and the at least one annular step.

10. The camshaft according to claim 1, wherein the at least one annular step includes two chamfered edges.

11. The camshaft according to claim 1, further comprising a seal disposed radially between the at least one annular step and the inner shaft.

12. The camshaft according to claim 1, wherein the outer shaft extends axially between a first axial end and a second axial end, and the at least one annular step is disposed in a region of the first axial end, and wherein the inner shaft has a constant outer diameter extending in an axial direction from an axially inner side of the at least one annular step towards the second axial end of the outer shaft.

13. The camshaft according to claim 1, wherein the at least one annular step defines an inwardly open groove facing the inner shaft, and wherein a sealing ring is arranged in the groove to seal the inner shaft with respect to the outer shaft.

14. The camshaft according to claim 13, wherein the sealing ring is composed of at least one of an elastomer and a polytetrafluoroethylene (PTFE) material.

15. A camshaft assembly, comprising:
   a tubular outer shaft having a first axial end and a second axial end opposite the first axial end;
   an inner shaft arranged coaxially to the outer shaft and rotatable at least partially with respect to the outer shaft;
   an annular gap disposed between the inner shaft and the outer shaft;
   at least one annular step disposed on the outer shaft, the at least one annular step arranged at the first axial end of the outer shaft and projects radially inwards towards the inner shaft, wherein the inner shaft is mounted with respect to the outer shaft via the at least one annular step; and
   wherein the inner shaft has a constant outer diameter along an outer circumferential face that extends in an axial direction of the inner shaft from an axially inner side of the at least one annular step towards the second axial end of the outer shaft.

16. The camshaft assembly according to claim 15, wherein the annular gap has a radial thickness of 0.2 mm to 2 mm.

* * * * *